Aug. 2, 1966  W. P. DOE  3,263,363
WHEEL ASSEMBLY
Original Filed March 6, 1961
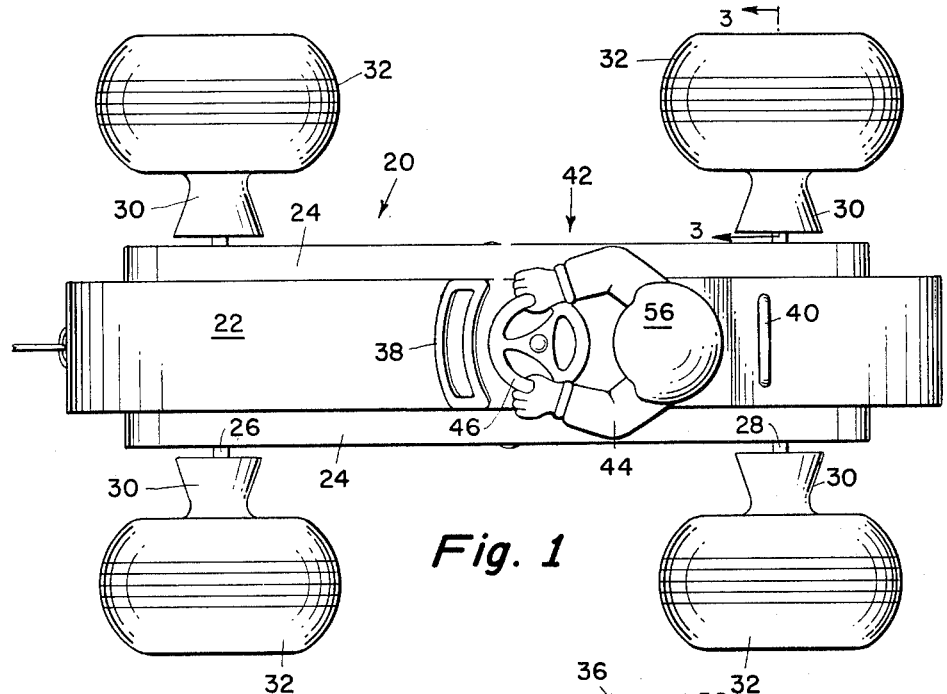
Fig. 1
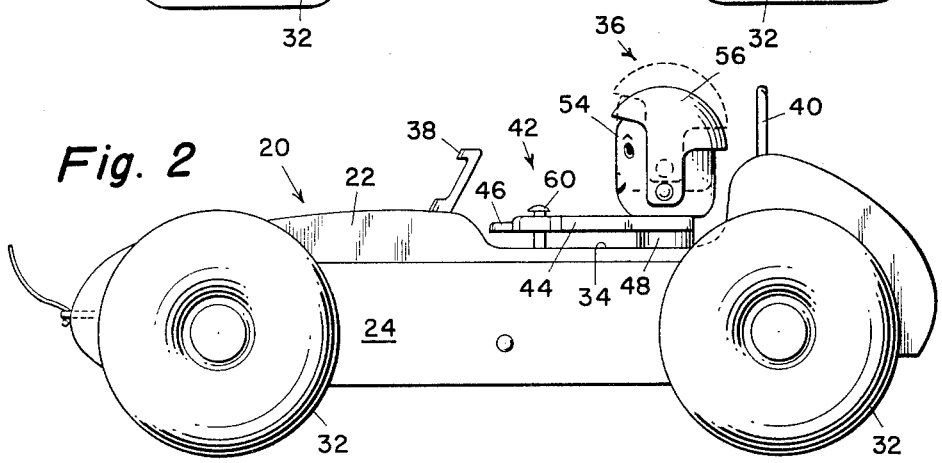
Fig. 2
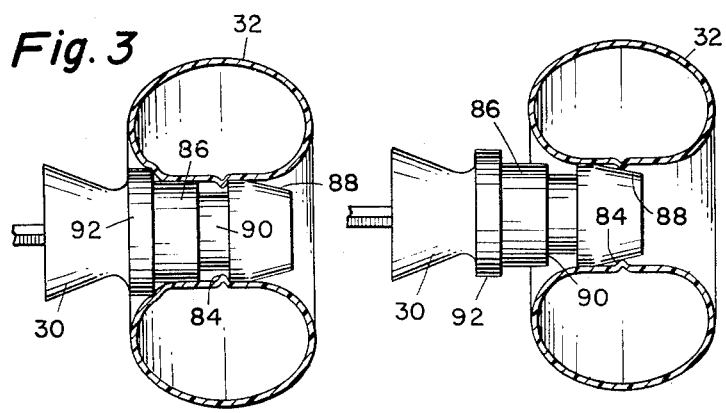
Fig. 3
Fig. 4
INVENTOR.
WALTER P. DOE
BY
his attorneys.

3,263,363
WHEEL ASSEMBLY
Walter P. Doe, East Aurora, N.Y., assignor to Fisher-Price Toys Inc., East Aurora, N.Y., a corporation of New York
Original application Mar. 6, 1961, Ser. No. 93,401. Divided and this application Feb. 17, 1964, Ser. No. 345,210
9 Claims. (Cl. 46—221)

This application is a division of my copending application Serial No. 93,401 filed March 6, 1961, and since abandoned.

This invention relates to action toys, and more particularly to a wheel assembly for toys of the type designed to be pulled or pushed across a supporting surface, such as a floor or the like.

One object is to provide an improved wheel and tire assembly wherein a resilient plastic or rubber tire may be readily placed in position on the wheel, and which will remain in proper position on the wheel and will not wobble relative thereto.

Another object is to provide an improved wheel and tire assembly wherein a resilient tire may be readily positioned on the wheel and which will be so securely engaged by the wheel that the tire cannot be removed without substantially destroying the tire or wheel.

Another object is to provide an improved wheel and tire assembly wherein the tire is securely held in position on the wheel without the use of auxiliary or detachable parts and wherein the tire and wheel each comprises a unitary member.

Another object is to provide a toy having the above advantages which is durable, reliable in operation, and requires a minimum number of parts which may be readily and economically manufactured and assembled.

To these and other ends the invention resides in certain improvements and combinations of parts, all as will be hereinafter more fully described, the novel features being pointed out in the claims at the end of the specification.

In the drawings:

FIG. 1 is a top plan view of a toy embodying the present invention;

FIG. 2 is a side elevation of the toy shown in FIG. 1;

FIG. 3 is an enlarged, partially sectioned, elevational view of a wheel and tire assembly of this invention, which view has been taken as indicated by the sectioning line 3—3 in FIG. 1; and FIG. 4 is a view similar to that of FIG. 3, but showing a relative position of the wheel and tire prior to mounting the tire in position on the wheel.

The preferred embodiment of the present invention, herein disclosed by way of illustration, is represented in the form of a small wheeled vehicle such as a race car shown generally at 20, wherein the head and portions of the driver's body are cause to move as the toy is propelled. However, it will be readily understood that the invention may be incorporated in any suitable type of wheeled toy, racer 20 merely being shown for the purposes of illustration.

Racer 20 preferably comprises a base or body portion 22 (FIG. 1) of wood or other suitable material which is shaped as shown in the drawings to give the desired appearance. Body portion 22 has side panel members 24 secured thereto as by nails or other suitable means, although if desired, members 22 and 24 may be formed from a single block of wood or may comprise a single plastic member. Racer 20 is provided with front and rear axles 26 and 28, respectively, which are mounted in suitable holes (not shown) in body members 22 and 24. Axles 26 and 28 have wheel or hub members 30 fastened to the opposite ends thereof. Hub members 30 are preferably of wood or other suitable material and in turn are adapted to receive and securely engage resilient tire members 32, which are of rubber, polyethylene or other suitable plastic material.

The upper surface of body member 22 is formed with a recessed portion 34 which simulates the cockpit of the racer and in which a simulated figure of a driver shown generally at 36, is positioned for movement, as hereinafter more fully described. A small windshield 38 (FIGS. 1 and 2) of plastic or other suitable material is mounted adjacent the forward edge of the cockpit, while a "roll-over" bar 40 of metal or the like is positioned at the rear of the cockpit.

Driver 36 preferably comprises a first action portion shown generally at 42 (FIG. 2) which is shaped to simulate the shoulders and arms 44 of the driver and steering wheel 46 of the vehicle. Member 42 is formed with a depending circular flange 48 adjacent the rear portion thereof. A plastic helmet 56 is secured to the driver's head. The driver's head 54 is mounted on the first action portion 42 for limited vertical movement relative thereto. The head 54 thus forms a second action member and can be caused to move with and relative to first action member 42 by means described in detail in my copending United States patent application, Serial No. 93,401, filed March 6, 1961.

It has been a problem with small wheeled vehicles and toys to keep the tires on the wheel, to keep the tires from wobbling on the wheels when a child pushes down on the toy, and to prevent relative rotation therebetween, especially when it is desired to have the wheels power a mechanism on the toys, such as an action or sound producing mechanism, or a combination of both. However, I have devised an improved tire and wheel assembly wherein a resilient rubber or plastic tire may be readily snapped in position on the wheel and which cannot be removed therefrom without substantially damaging the tire or wheel. I have been able to achieve this construction without the use of any separate retaining rings or discs, and provide a construction wherein the resistance to relative rotation between the tire and wheel is more than sufficient to insure proper operation of a conventional actuating or sound producing mechanism when the toy is moved along a supporting surface.

In order to accomplish the above, I preferably form each of tires 32 with an inwardly extending circular ridge 84 (FIG. 3) on the inner bore, substantially midway between the inside and outside of the tire as shown in FIGS. 3 and 4. Tires 32 may be of any suitable material but I prefer to use blown polyethylene tires having a reasonable degree of resiliency. Wheel 30 is formed with a hub diameter 86 which is somewhat greater than the diameter of the internal bore of the tire when the tire is in its normal at-rest position. One end of wheel 30 is tapered, as at 88, as shown in FIGS. 3 and 4, and the hub is provided with a circumferentially extending recess or groove 90 which is adapted to receive ridge 84 as shown in FIG. 3. While the above provides a good degree of frictional resistance between the tire and wheel, I have further found that the interengagement between the tire and wheel may be improved by providing the hub with a tire engaging rim 92 which is axially spaced from the recess and which is of greater diameter than the normal diameter 86 of the hub. In the present embodiment, rim 92 is positioned in the region of the axially inner end of the hub. Prior to positioning tire 32 on wheel 30 the axial distance between the axially outer edge of rim 92 and the axially outer edge of groove 90 is less than the axial distance along the tire from ridge 84 to that portion of the tire, which engages the axially outer edge of the rim 92 as shown in FIG. 4.

As a result, when tire 32 is positioned on wheel 30, rim 92 forces the inner portion of the tire to expand to accommodate the rim and at the time time exerts considerable axial pressure against the tire, forcing ridge 84 securely against the axially outer edge of groove 90, as shown in FIG. 3. This pressure stabilizes the tire on the wheel and results in a fit which is so tight that the tire cannot be removed from the same without seriously damaging either the tire or the wheel. Not only is the tire securely fastened to the wheel, but the frictional engagement between the two is sufficient to prevent relative rotation therebetween, except under the most unusual circumstances, and as a result, whenever the tire rotates, the wheel and any associated parts will also rotate. Despite the tenacity of the engagement between the tire and the wheel, the tire may be readily snapped into position on the wheel by merely inserting it over the tapered portion 88 as in FIG. 4 and pressing inwardly until ridge 84 snaps into groove 90.

Thus my invention provides an improved wheel and tire construction wherein the tire may be readily snapped into place on the wheel and which will at the same time afford excellent interengagement between the wheel and the tire, so that any motion imparted to the tire member is transmitted to the wheel and onto the actuating means or sound producing mechanism, if such should be used in conjunction with this construction.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A wheel assembly for toy vehicles and the like, comprising a resilient tire having an internal bore extending therethrough with a radially inwardly extending ridge located substantially midway between opposite sides of said tire, a wheel having a diameter slightly larger than the diameter of said bore and having a recess that receives said ridge of said tire when said tire is positioned on said wheel, said wheel having an enlarged rim portion with an edge that engages one side of said tire, the axial distance from said edge of said rim to the edge of said recess distal to said edge of said rim being sufficiently less than the axial distance, prior to said tire being positioned on said wheel, between said ridge on said tire and said side of said tire that when said tire is positioned on said wheel frictional engagement between said wheel and said tire normally prevents relative rotation therebetween.

2. A wheel assembly for toy vehicles and the like, comprising a resilient tire having an internal bore extending therethrough with a radially inwardly extending ridge located substantially midway between opposite sides of said tire, a wheel having a diameter slightly larger than the diameter of said bore and having a recess that receives said ridge of said tire when said tire is positioned on said wheel, said wheel having an enlarged rim portion with an axially outer edge that engages the axially inner side of said tire and forces the same outwardly in a radial direction to accommodate said rim, the distance from said edge of said rim to the axially outer edge of said recess being sufficiently less than the axial distance, prior to said tire being positioned on said wheel, between said ridge and that portion of said side of said tire that engages said edge of said rim, that when said tire is positioned on said wheel frictional engagement between said tire and said wheel normally prevents relative rotation therebetween.

3. A wheel assembly comprising
  a wheel member that is formed with a circumferential mounting surface on which a tire member can be mounted, and that is formed with an angularly and radially extending abutment shoulder means,
  a generally toroidal, resilient tire member that is formed with a central bore therethrough that has a diameter that permits snug engagement of the tire member on the mounting surface of the wheel member,
  means projecting generally/radially inwardly from the surface of said tire member that is disposed about said bore, and that is formed for abutting engagement against said abutment shoulder,
  and means for engaging against the tire member remote from said projecting means, when the tire member is mounted on the wheel member, constantly to urge the tire member into position for resiliently engaging said projectnig means against said shoulder.

4. A wheel assembly in accordance with claim 3 wherein said wheel member is formed with a radially outwardly projecting shoulder at one end of said mounting surface, that functions as said means for engaging against the tire member.

5. A wheel assembly in accordance with claim 4 wherein said radially outwardly projecting shoulder is disposed at a distance from the abutment shoulder such that the tire member is placed under compression between said shoulders when it is mounted on the wheel member.

6. A wheel assembly comprising
  a wheel member that is formed with a circumferential mounting surface on which a tire member can be mounted, and that is formed with groove means in said mounting surface intermediate the ends thereof.
  a generally toroidal, resilient tire member that is formed with a central bore therethrough that has a diameter that permits snug engagement of the tire member on the mounting surface of the wheel member, said tire member being formed with generally radially inwardly projecting ridge means on the surface thereof that is disposed about said bore, and that is formed for engagement in said groove means and for abutment against the wall of said groove means,
  and means for engaging against the tire member when the tire member is mounted on the wheel member, at a location remote from said ridge means, constantly to urge the tire member into position for resiliently engaging against the wall of said groove means.

7. A wheel assembly in accordance with claim 6 wherein said means for engaging against the tire member, when the tire member is mounted on the wheel member, is disposed at a distance from the groove means such that the tire member is placed under compression between said tire member engaging means and the wall of the groove when the tire member is mounted on the wheel member.

8. A wheel assembly comprising
  a wheel member that is formed with a circumferential, generally cylindrical mounting surface on which a tire member can be mounted, and that is formed in said surface with an endless circumferential groove,
  a generally toroidal, hollow, resilient tire member that is formed with a central bore therethrough that has a diameter that is slightly smaller than the diameter of the mounting surface on the wheel member to permit snug engagement of the tire member on the mounting surface of the wheel member,
  said tire member being formed with an endless ridge that projects generally radially inwardly from the surface of said tire member that is disposed about said bore, and that is formed for engagement in said groove and for abutting engagement against a wall of the groove,
  and a rim means that is secured to said wheel member and that provides a radially outwardly projecting shoulder at one end of said mounting surface, and that is disposed, when the tire member is mounted on the wheel member, for engaging against the tire member at a location remote from said ridge, constantly to urge the tire member into position for resiliently engaging said ridge against a wall of the groove, and to place the tire under compression between said shoulder and the wall of the groove when it is mounted on the wheel member.

9. A wheel assembly in accordance with claim 8 wherein said wheel member is formed at the end of its mounting surface that is remote from said radially projecting shoulder with a generally conical tapered surface, to facilitate mounting the tire member on the wheel members.

References Cited by the Examiner
UNITED STATES PATENTS

| | | | |
|---|---|---|---|
| 2,035,870 | 3/1936 | Dombrowski | 46—109 |
| 2,597,588 | 5/1952 | Manoil | 46—221 |
| 2,778,159 | 1/1957 | Irwin | 46—221 |
| 2,878,074 | 3/1959 | Cawl | 46—221 X |

RICHARD C. PINKHAM, *Primary Examiner.*

L. J. BOVASSO, *Assistant Examiner.*